April 18, 1933.   W. F. NEWHOUSE   1,904,384
MACHINE FOR MAKING AND INSERTING WIRE FASTENERS FOR BASKET COVERS
Filed Nov. 9, 1931   14 Sheets-Sheet 1

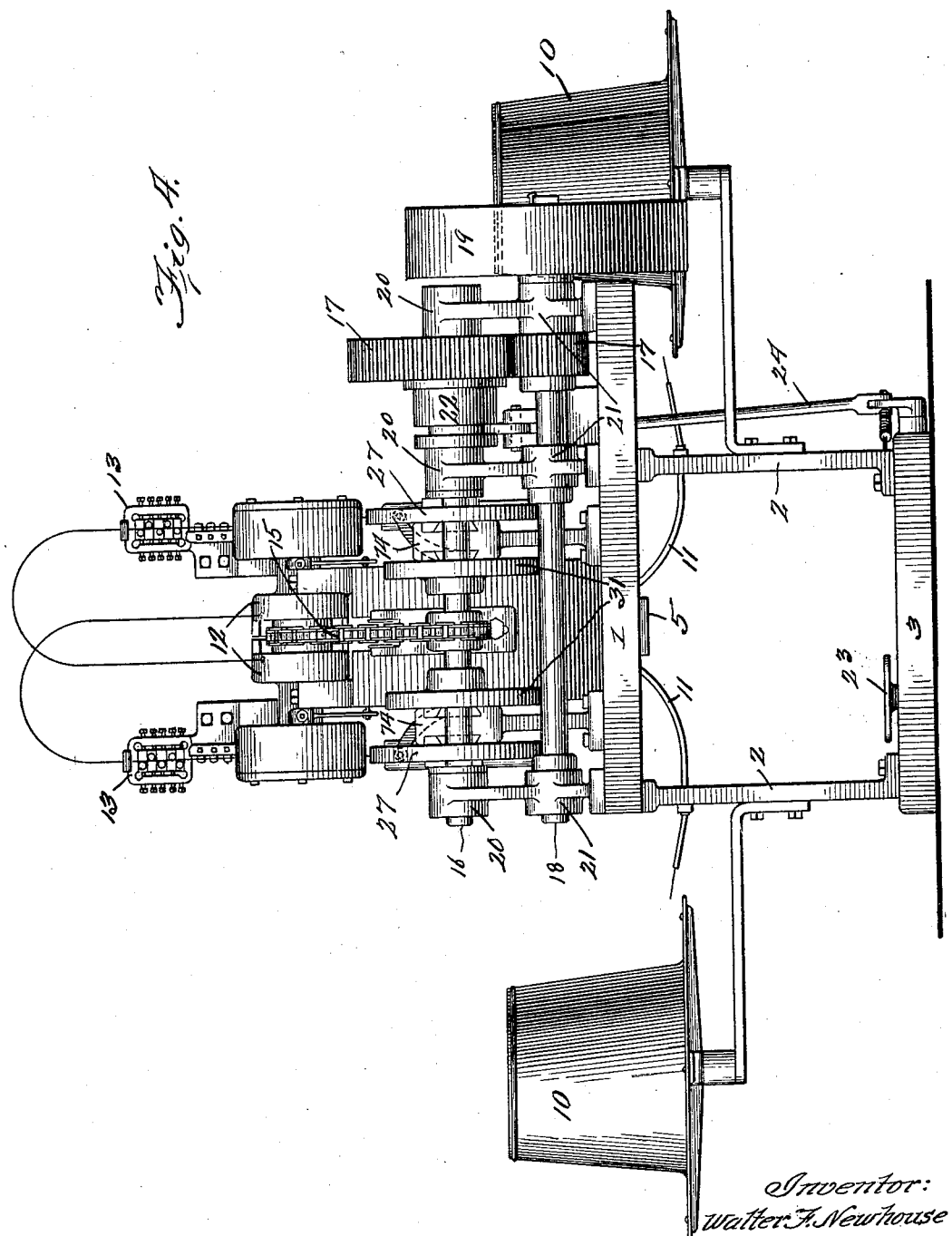

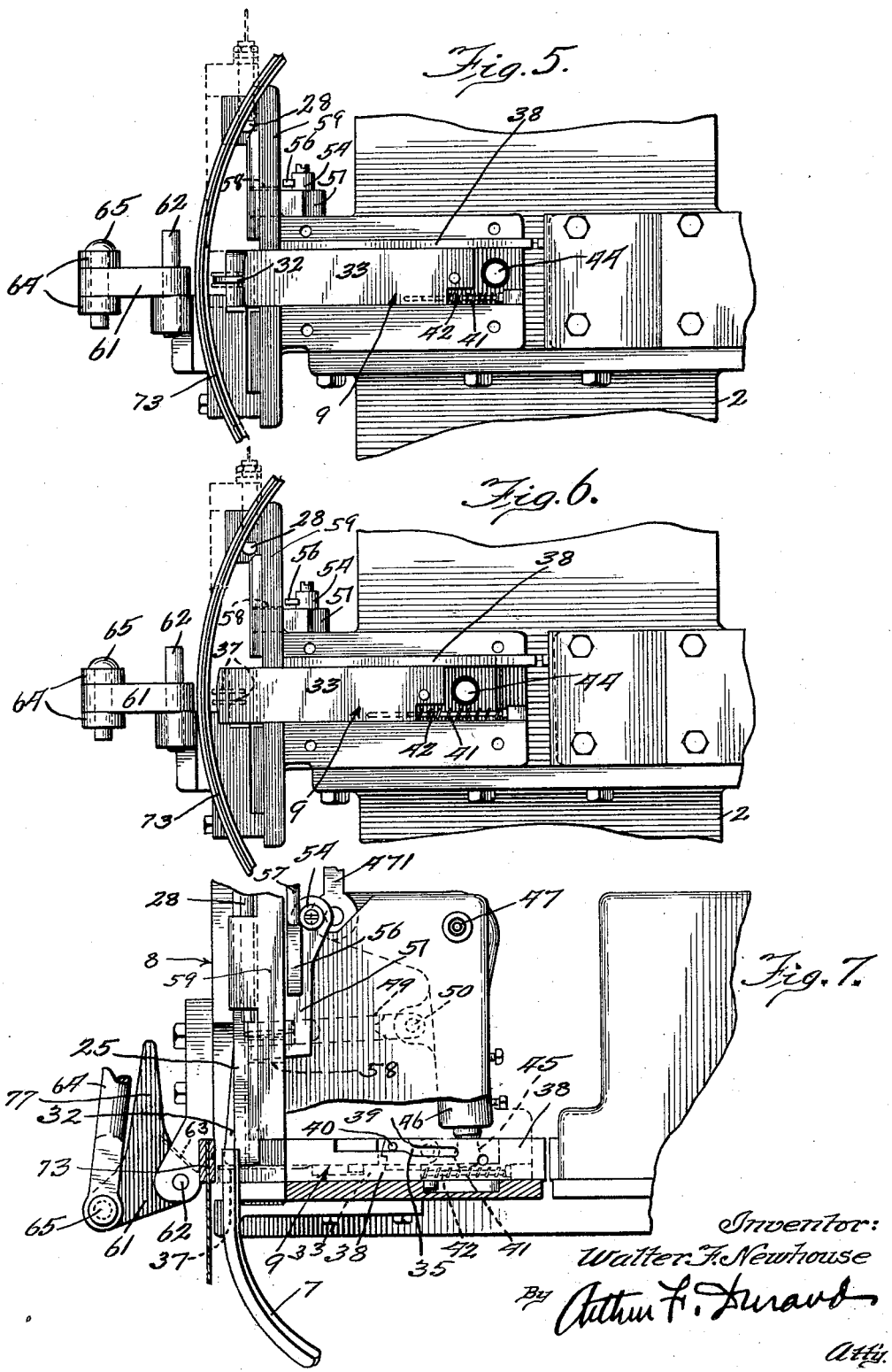

April 18, 1933.  W. F. NEWHOUSE  1,904,384
MACHINE FOR MAKING AND INSERTING WIRE FASTENERS FOR BASKET COVERS
Filed Nov. 9, 1931  14 Sheets-Sheet 6
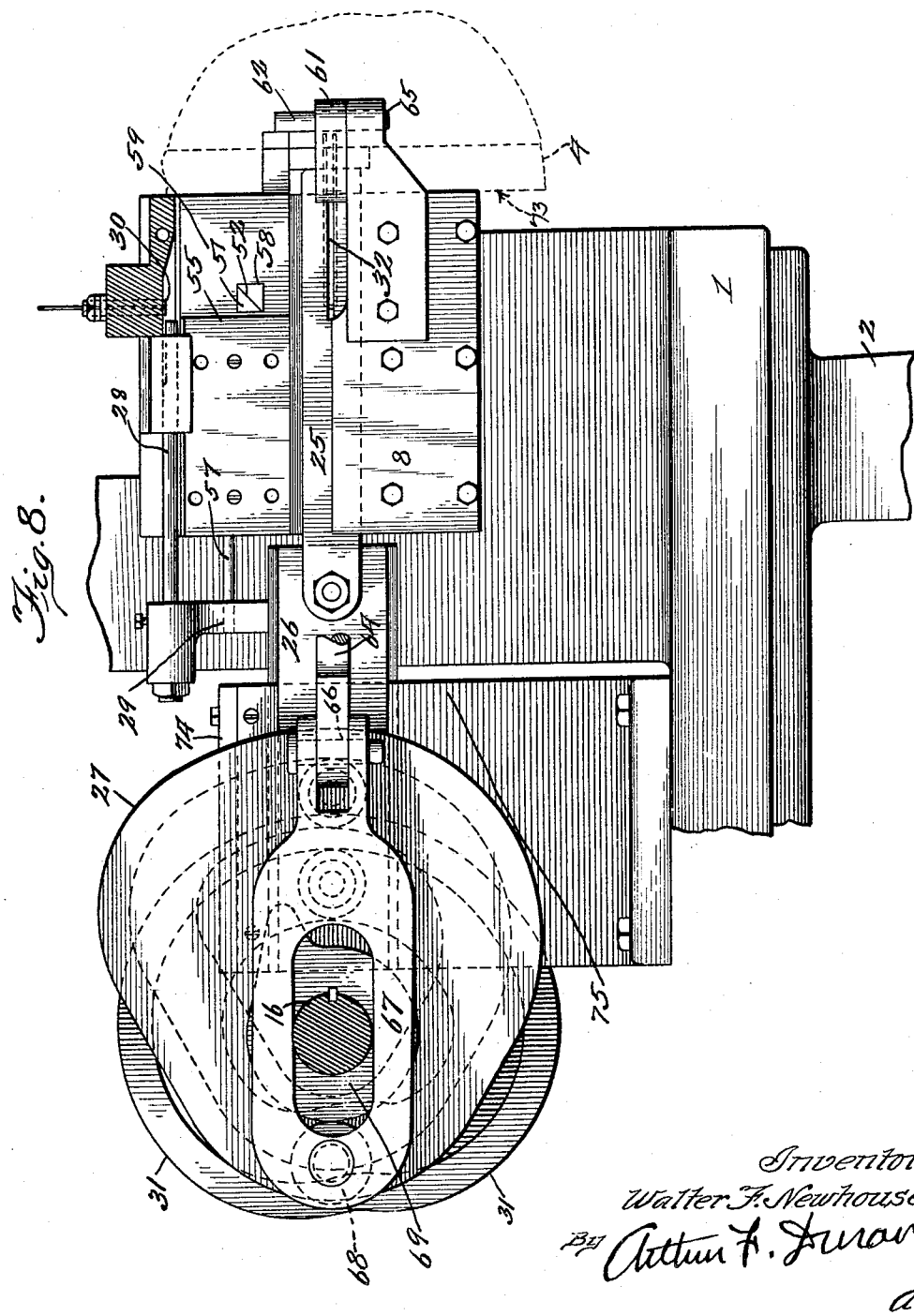
Inventor:
Walter F. Newhouse

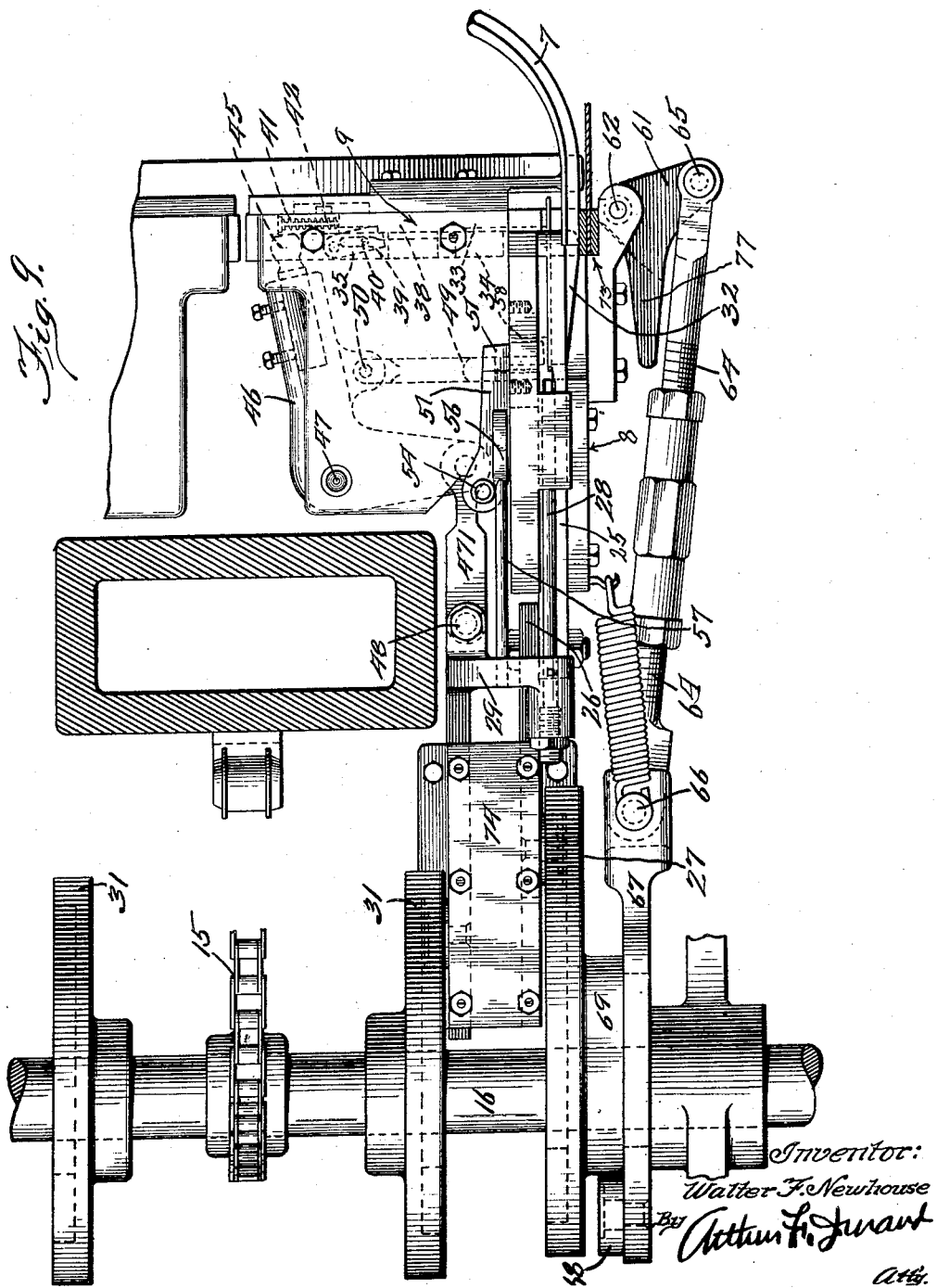

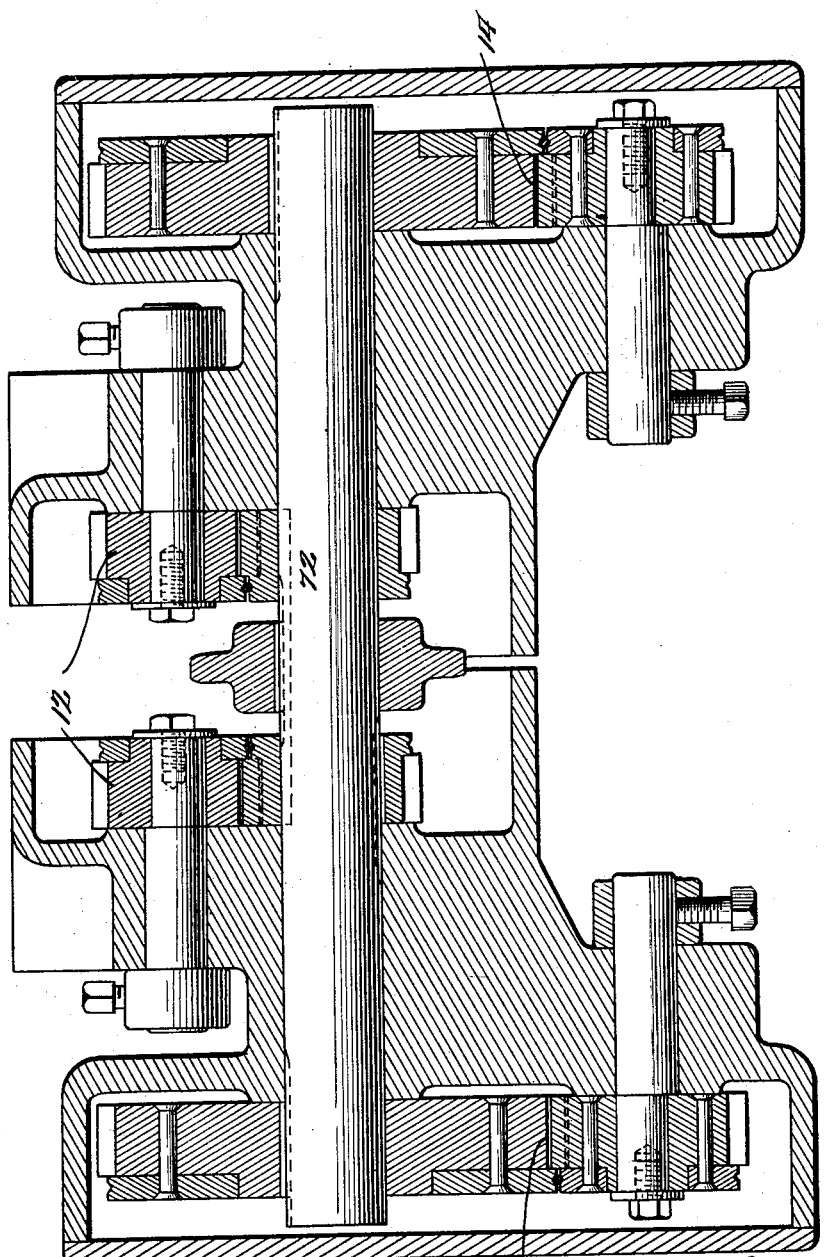

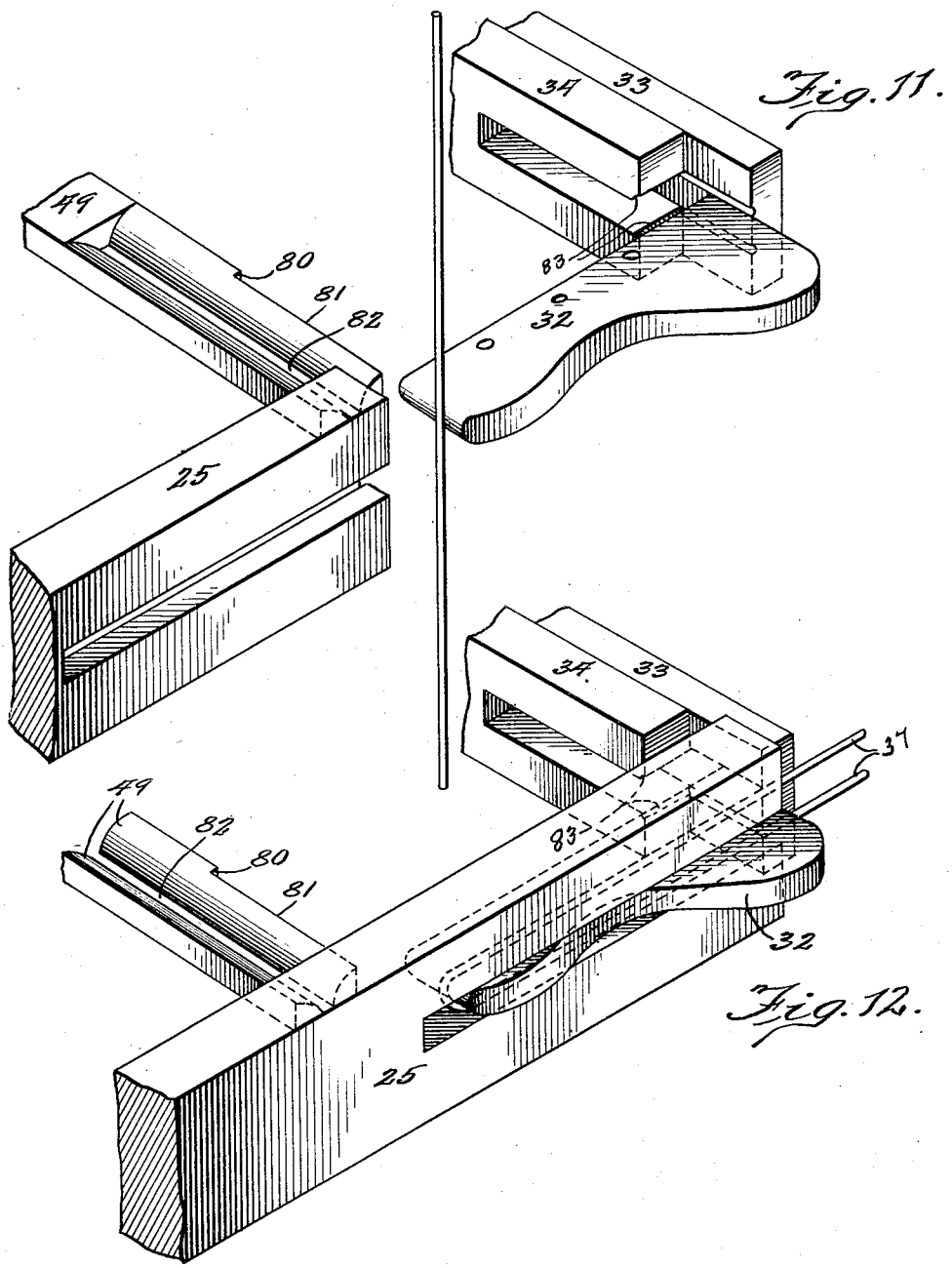

April 18, 1933.  W. F. NEWHOUSE  1,904,384
MACHINE FOR MAKING AND INSERTING WIRE FASTENERS FOR BASKET COVERS
Filed Nov. 9, 1931   14 Sheets-Sheet 10
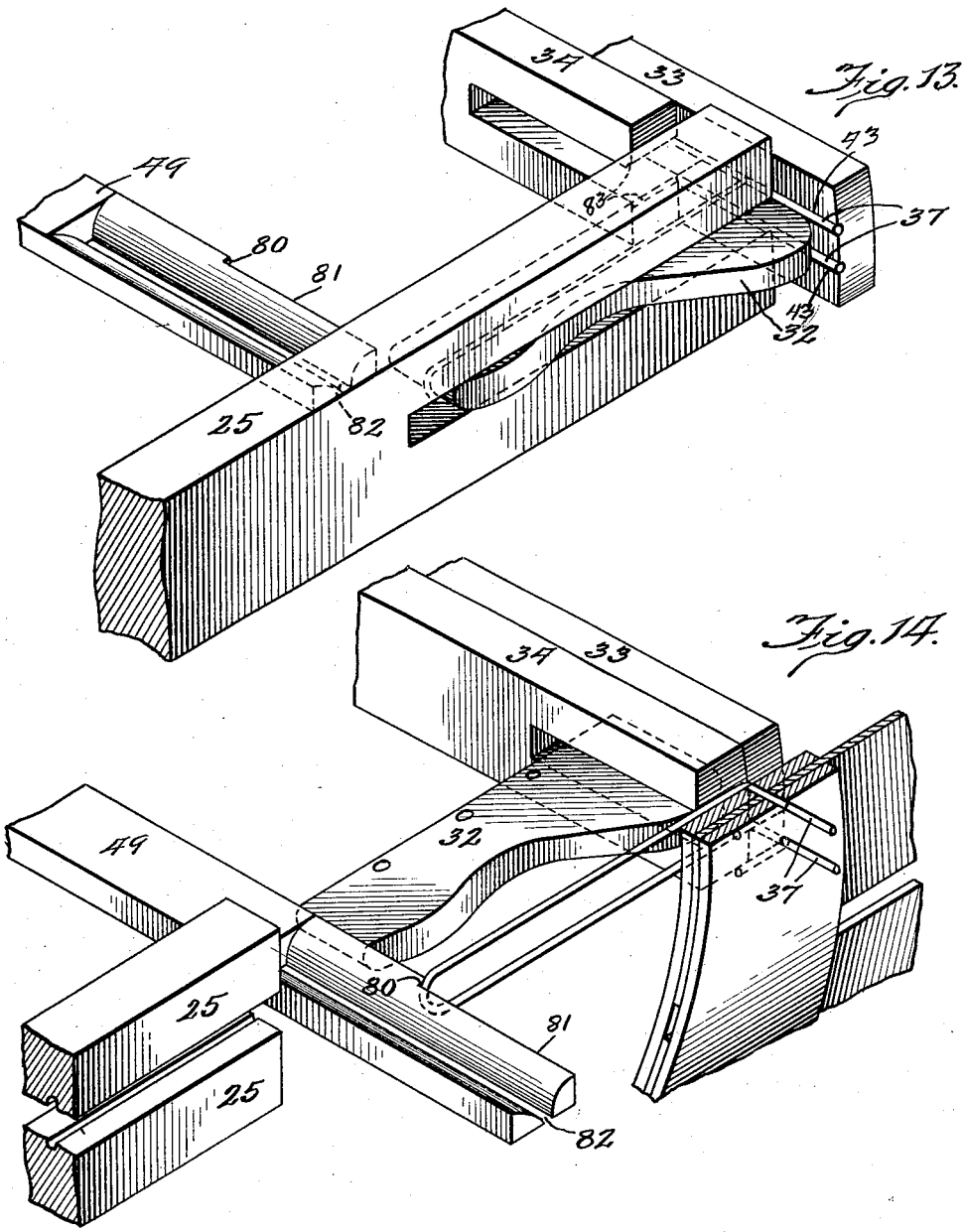

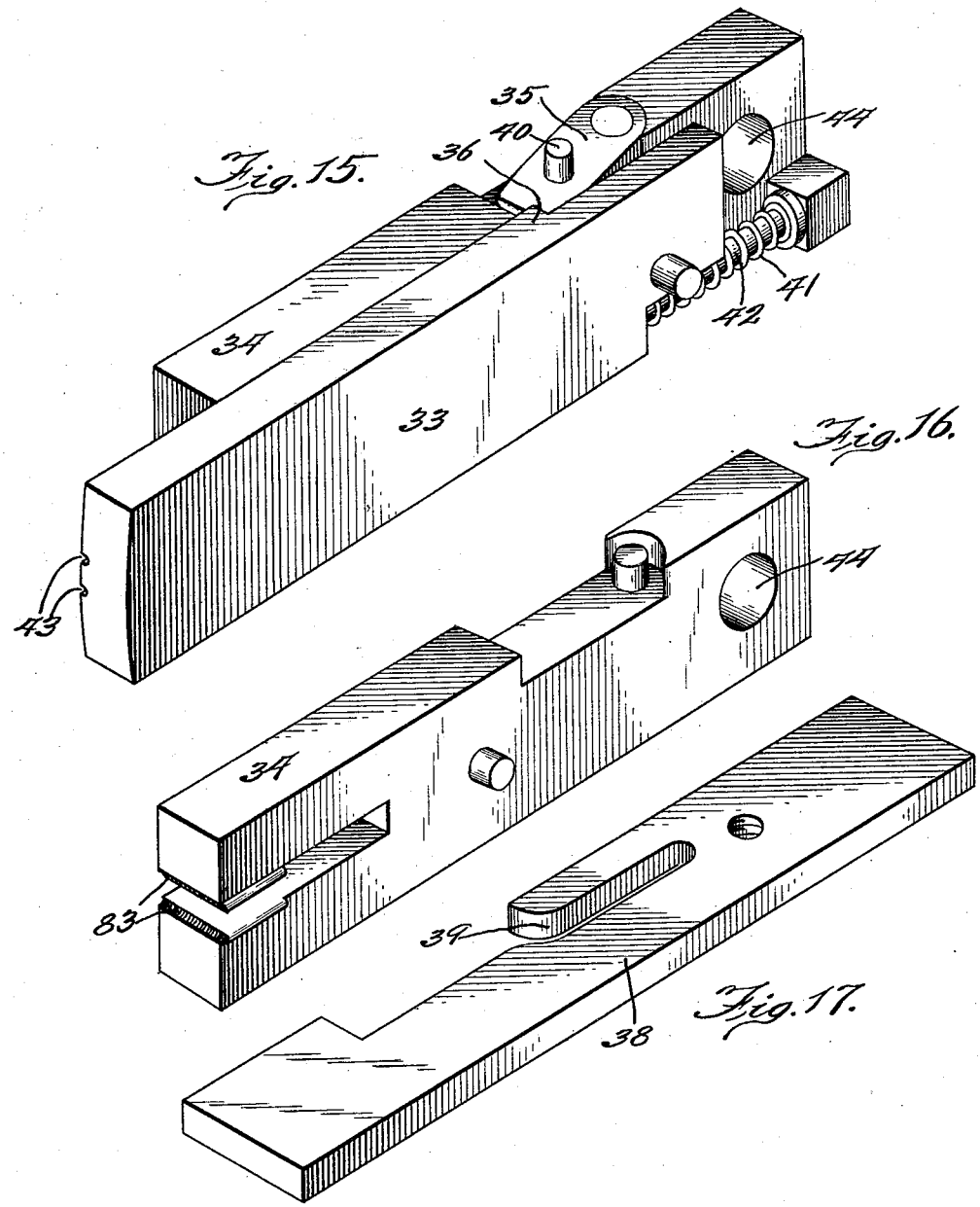

April 18, 1933.  W. F. NEWHOUSE  1,904,384
MACHINE FOR MAKING AND INSERTING WIRE FASTENERS FOR BASKET COVERS
Filed Nov. 9, 1931   14 Sheets-Sheet 12
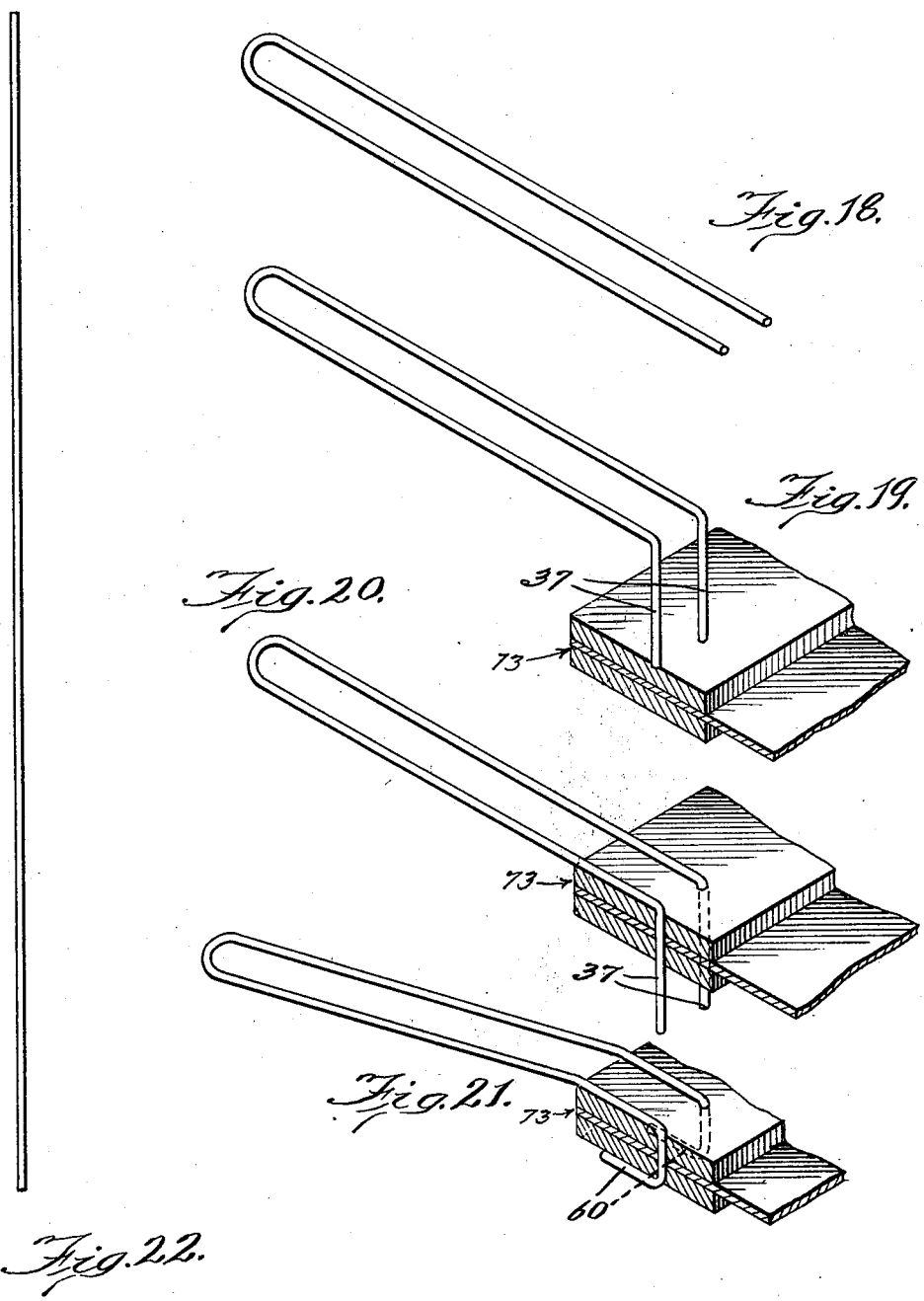

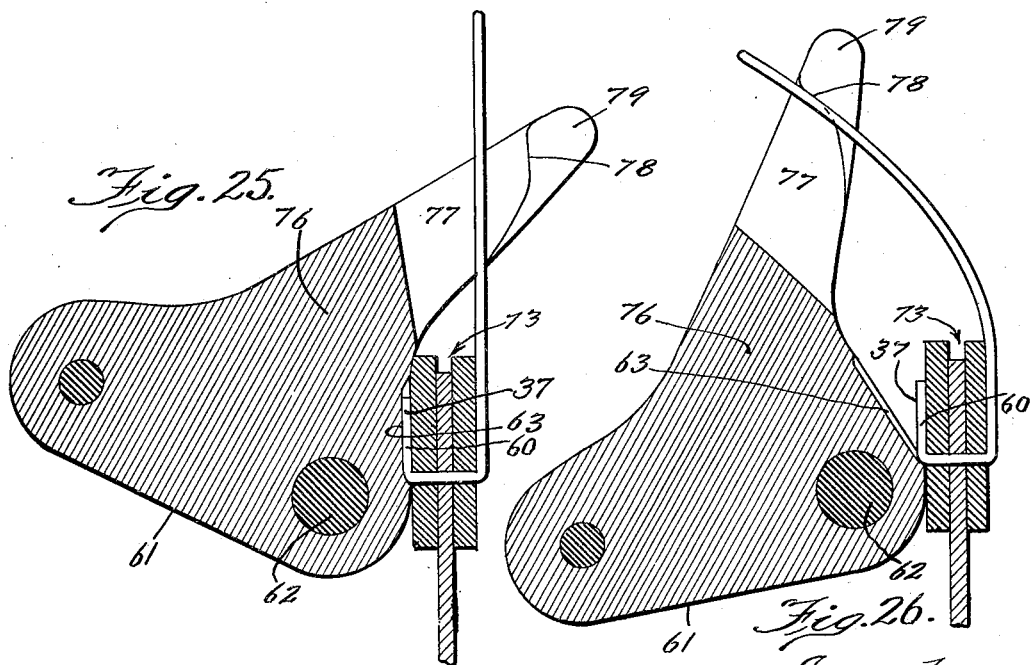

April 18, 1933. W. F. NEWHOUSE 1,904,384
MACHINE FOR MAKING AND INSERTING WIRE FASTENERS FOR BASKET COVERS
Filed Nov. 9, 1931 14 Sheets-Sheet 14
Fig. 27.
Fig. 28.
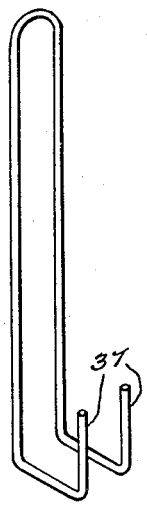
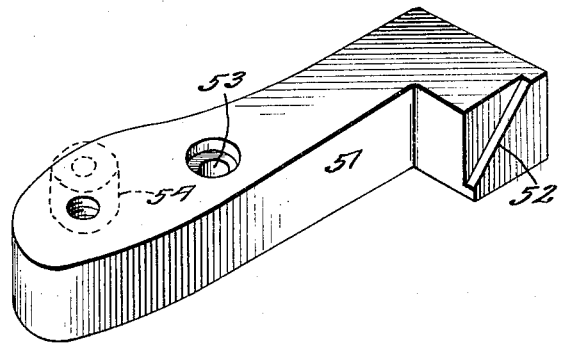
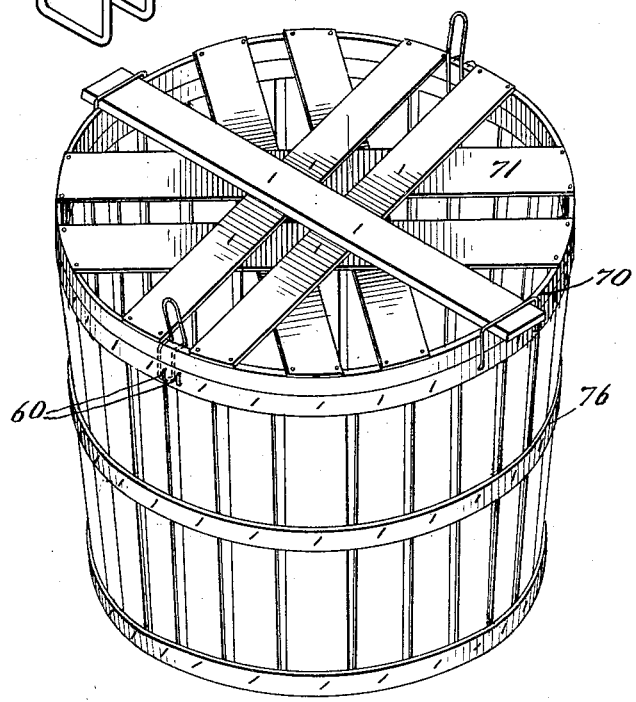
Fig. 29.
Fig. 30.
Inventor:
Walter F. Newhouse
By Arthur F. Durand
Atty.

Patented Apr. 18, 1933

1,904,384

UNITED STATES PATENT OFFICE

WALTER F. NEWHOUSE, OF BENTON HARBOR, MICHIGAN

MACHINE FOR MAKING AND INSERTING WIRE FASTENERS FOR BASKET COVERS

Application filed November 9, 1931. Serial No. 573,784.

This invention relates to machinery for making and inserting bail-shaped, or staple-shaped, wire fastening devices in the rims of bushel or half-bushel baskets or other similar containers, by means of which wire devices the covers of the baskets or other containers are thereafter fastened in place.

Generally stated, the object of the invention is to provide a novel and improved construction and arrangement whereby these wire devices are inserted outwardly through the rim of the basket or other container, in an efficient and more satisfactory manner than heretofore, and are then clinched on the outer side of the basket rim, in such manner that these wire devices are more effectively anchored in the basket rim, and are of such character that they may then be bent into position for effectively holding the covers of the baskets in place.

It is also an object to provide certain details and features of construction and combinations tending to increase the general efficiency and the desirability of a machine of this particular character.

To the foregoing and other useful ends, the invention consists in matters hereinafter set forth and claimed, and shown in the accompanying drawings in which—

Fig. 4 is a rear elevation of said machine.

Fig. 5 is an elevation, on a larger scale, of the rear side of one of the fastener driving heads for inserting the wire through the basket rim.

Fig. 6 is a similar view showing the parts in different positions.

Fig. 7 is a plan view of the driving mechanism shown in Figs. 5 and 6 of the drawings.

Fig. 8 is a side elevation of the mechanism for forming the bail-shaped or staple-shaped wire fasteners, preliminary to the bending of the ends of the fasteners at right angles to the body portion thereof, it being understood that this mechanism is duplicated at opposite sides of the machine, in the particular machine shown, inasmuch as this machine is equipped to insert two wire fasteners at opposite sides of the basket at the same time, showing certain elements broken away for convenience of illustration.

Fig. 9 is a plan view of the mechanism shown in Fig. 8 of the drawings.

Figure 1:
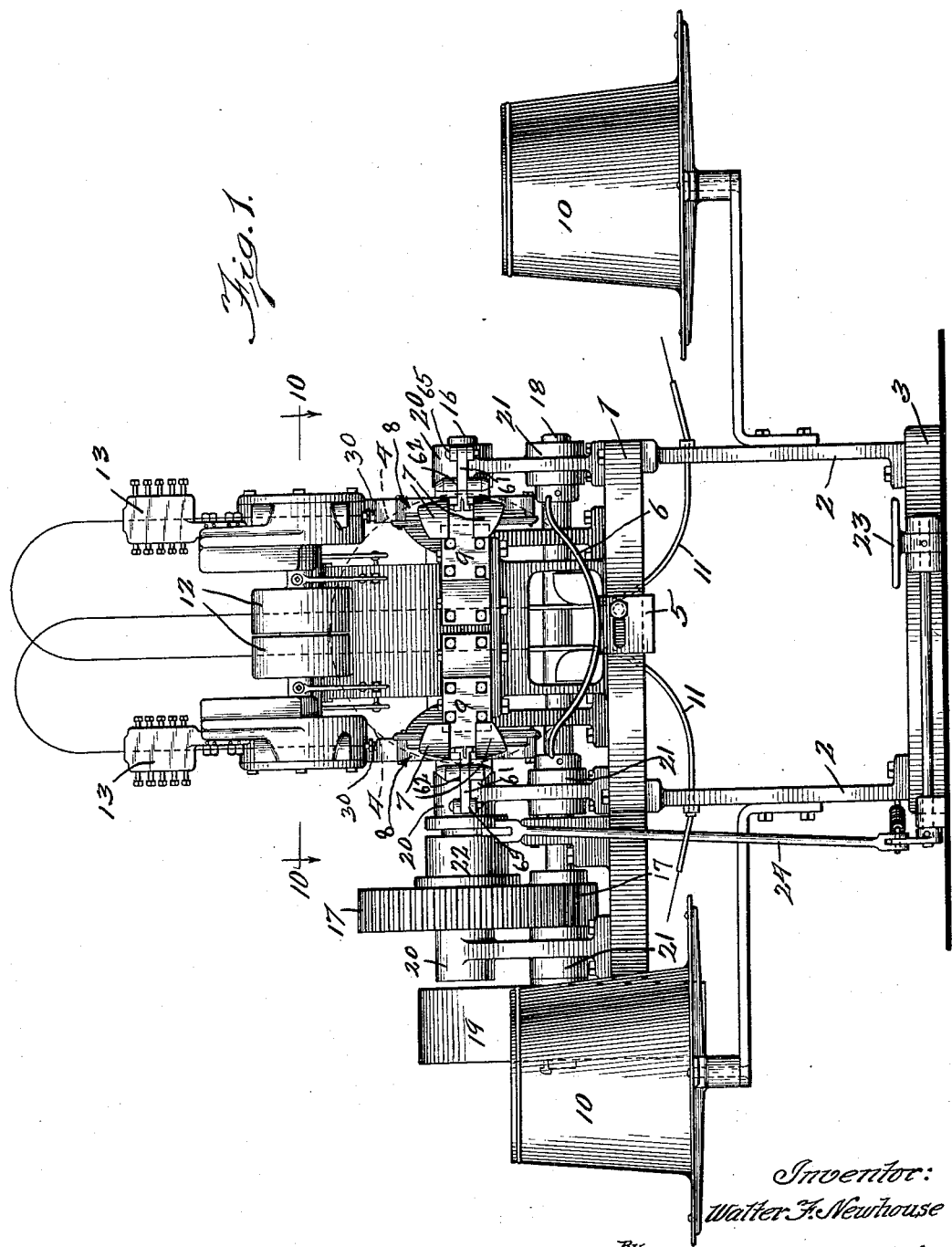
Fig. 1 is a front elevation of a machine for making and inserting wire articles, preferably fasteners for securing basket covers in place.
Figure 2:
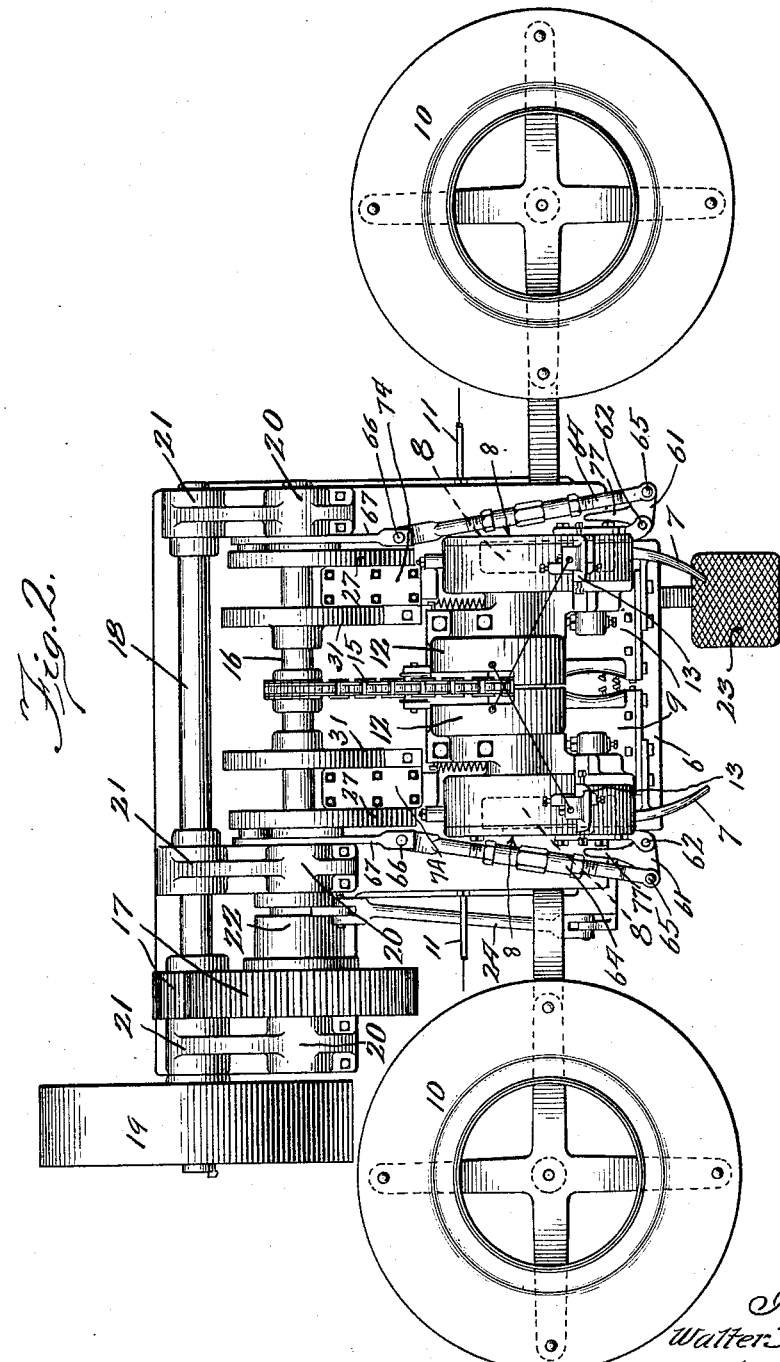
Fig. 2 is a plan view of said machine.

Fig. 10 is an enlarged horizontal section on line 10—10 in Fig. 1 of the drawings.

Figs. 11 and 12 are perspective views illustrating the operation of the elements which bend each cutoff length of wire into bail shape or staple shape, preliminary to the bending of the ends of the wire device at right angles.

Figs. 13 and 14 are similar views illustrating the bending of the wire ends at right angles and the insertion thereof through the basket rim.

Figs. 15, 16 and 17 are perspective views of certain elements involved in the mechanism for bending the wire ends at right angles.

Fig. 18 is a perspective of the bail-shaped or staple-shaped wire fastening device, before the ends thereof are bent at right angles.

Fig. 19 is a similar view showing the wire ends bent at right angles and ready for insertion through the basket rim.

Fig. 20 is a similar view showing the wire ends inserted through the basket rim.

Fig. 21 is a similar view showing the wire ends clinched on the outer side of the basket rim.

Fig. 22 is a side elevation of the straight length of wire from which the basket cover fastener is made.

Figs. 23 and 24 are perspective views of one of the pivoted clinchers of the fastener attaching mechanism.

Figs. 25 and 26 are detail sectional views of said pivoted clinchers, showing the mode of operation thereof.

Fig. 27 is a perspective of the fastener in the condition in which it is shown in Fig. 25 of the drawings, the fastener in this condition being in a vertical plane parallel with the axis of the basket.

Fig. 28 is a perspective of one of the pivoted wire guiding devices hereinafter described.

Fig. 29 is a perspective of one of the baskets to which the wire fasteners or cover retainers are applied by the machine herein disclosed.

Fig. 30 is a perspective of the wire fastener or retaining device in the condition in which it is left by the operation of the machine shown in Fig. 26 of the drawings.

As thus illustrated, the invention comprises a horizontal base 1, of any suitable or desired character, preferably supported in an elevated position by the upright frame members 2 on a lower base 3, which latter rests on the floor. The base 1 supports the operative parts in a suitable elevated position, as hereinafter will more fully appear.

Figure 3:
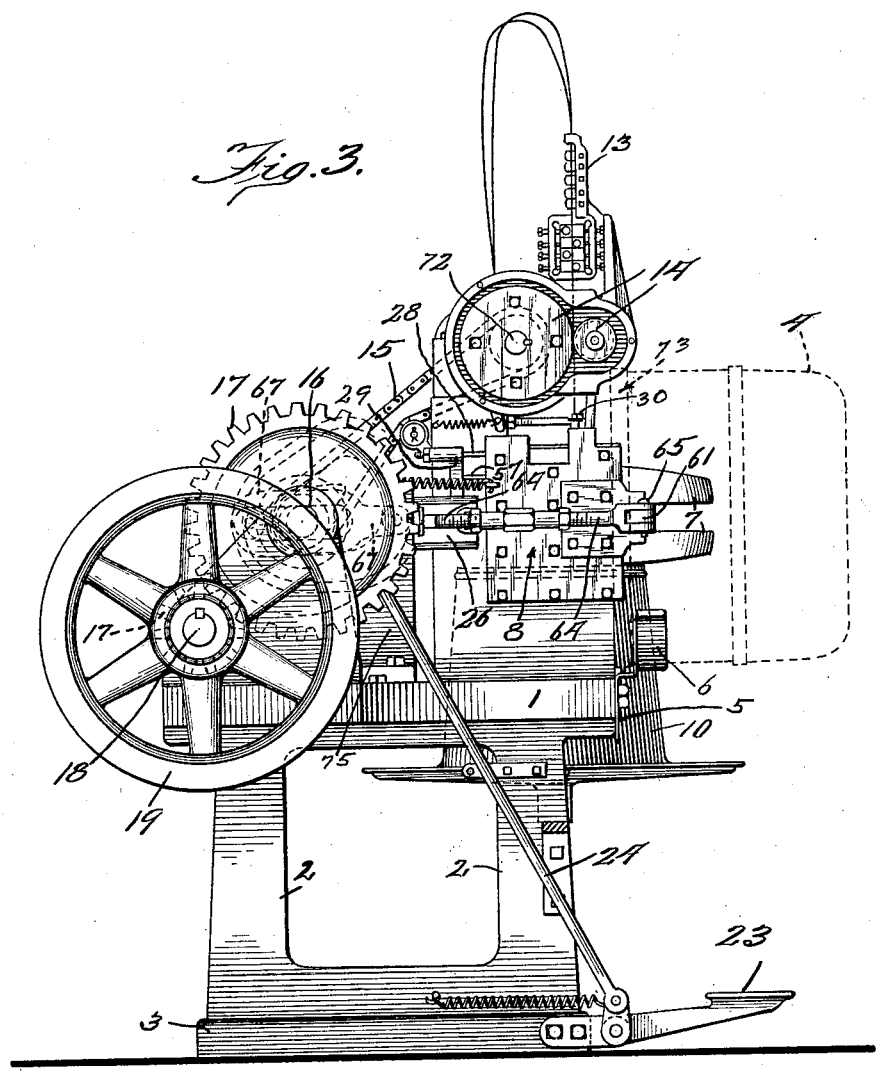
Fig. 3 is a side elevation of said machine.

In the machine shown and described, means are provided for fastening two wire fasteners at oppositely disposed points, on a bushel or half-bushel basket, at the same time. For this purpose, the basket will occupy the position shown in dotted lines at 4 in Figs. 1 and 3, the axis of the basket extending horizontally and from front to rear of the machine. At the front of the machine, on an adjustable bracket 5, a basket support 6 is provided, to engage the lower side of the basket, as illustrated in the drawings. Curved supports 7 are mounted in stationary position, at opposite sides of the machine, to engage the inner sides of the basket, and to thus guide the mouth of the basket into position to have the wire fasteners properly attached to the rim thereof.

The wire is reduced to bail-shaped or staple-shaped form in the two forming heads 8, one at each side of the machine, disposed parallel, so that the two bail-shaped or staple-shaped preliminary blanks, so to speak, from which the fasteners are made, are formed in parallel planes extending parallel with the axis of the basket. Thereafter, the ends of the fasteners are bent at right angles in the fastener driving heads 9 and 9 disposed at the front of the machine, in position to insert the right-angle ends of the fasteners through the opposite sides of the basket rim, and to clinch these ends on the outer sides of the basket rim, as shown in Figs. 20 and 21 of the drawings.

The wire is fed from the reels 10 through the tubes 11 upwardly to the centrally located feed mechanism 12, continuously, then downwardly through the friction or straightening devices 13, and then downwardly between the feed rolls 14, a pair of these feed wheels being disposed at opposite sides of the machine, in position to intermittently feed the wire downwardly to the fastener-forming heads 8 previously mentioned. Continuous feed rolls, and intermittent feed rolls, are well known, and they may be of any known character. Said wire feeding mechanism is operated by a sprocket chain 15 from the shaft 16, the latter being operated by gearing 17 from the drive shaft 18 operated by a pulley 19 in any suitable or desired manner. Said shafts 16 and 18 are supported in bearings 20 and 21 suitably mounted on the elevated base 1 previously mentioned. It will be seen that when the basket is in position, the driving heads 9 are partially within the interior of the basket, and are adapted to operate inside of the basket, thereby to insert the wire ends of the fasteners outwardly through the basket rim, in the manner shown in the drawings.

The shaft 16 is provided with the clutch mechanism 22, controlled from the foot treadle 23 through the medium of the clutch shifting rod 24, in a manner that will be readily understood, whereby the machine can be started, from the constantly running shaft 18, at the will of the operator or attendant.

Inasmuch as the fastener forming mechanism 8 is the same at each side of the machine, a description of the mechanism at one side will be sufficient.

Referring to Figs. 5 to 9, and 11 to 14, inclusive, it will be seen that each fastener forming mechanism comprises a reciprocating and bifurcated former 25, which is somewhat similar to an ordinary staple former, operated by a slide 26, which latter is in turn operated by a cam 27 on the shaft 16 previously mentioned. A wire cutter 28, actuated endwise by the slide 29, co-operates with the wire feed tube 30 to cut off the wire, to provide a proper length of wire to be bent into fastener form. The slide 29 is in turn actuated by a cam 31 on said shaft 16 previously mentioned. See Figs. 8 and 9 of the drawings. The bifurcated former 25 then co-operates with the stationary anvil 32, which latter is secured to any stationary portion of the machine, to bend the length of wire into staple or bail form, as shown in Fig. 12 of the drawings. This fastener forming mechanism, operated in this manner, is the same at each side of the machine.

Each fastener driving mechanism 9 is the same as the other, being duplicated at opposite sides of the machine, and a description of one fastener driving mechanism will be sufficient.

Referring to Figs. 15, 16, and 17, it will be seen that each fastener driving mechanism comprises a wiper or deflector 33 and a driver 34, the two being normally locked together by the latch 35 pivoted on the driver and adapted to engage the shoulder 36 on the wiper or deflector, thereby to actuate the latter in synchronism with the driver 34, in order to deflect the ends 37 of the fastener in the manner shown in Fig. 19 of the drawings. This having been done, the fastener is now ready to be inserted through the basket rim, and for this purpose the control or cam plate 38, removably fastened in place directly above the horizontally operating wiper 33 and driver 34 is provided with a cam groove 39 for engaging the pin 40 on the latch 35 previously mentioned. As soon as the pin 40 strikes the mouth or outlet of the slot 39 the latch 35 is disengaged from the wiper or deflector 33, and the fastener ejector and driver 34 then proceeds alone to exert endwise pressure against the bent end portions 37, thereby to insert the latter through the basket rim. At this time, the spring 41, surrounding the rod 42, which latter is rigid with the driver 34, exerts its pressure on the wiper or deflector 33, thereby to keep the latter in firm engagement with the inside of the basket rim, whereby the grooves 43 of this wiper or deflector serve as guides to support the fastener portions 37 during the endwise forcible insertion thereof through the basket rim. The driver 34 has a hole 44 to engage the ball-like head 45 of the bell crank 46, which latter is pivoted on a stationary portion of the machine at 47, in the manner shown more clearly in Figs. 7 and 9 of the drawings. The head 45 is preferably removable from the bell crank 46, so that it may be repaired or replaced when worn or impaired by continued use. The bell crank 46 is actuated by a link 471 pivoted at 48 on the slide 29 previously mentioned. The bifurcated stripper 49 is pivoted at 50 on the said bell crank 46, whereby both this stripper and the driver 34 and the wiper 33 are actuated by the bell crank, from the slide 29, to remove the staple-shaped or bail-shaped fastener from the stationary anvil plate 32 previously mentioned, in the manner illustrated more clearly in Figs. 13 and 14 of the drawings, thereby to move the fastener bodily and with sufficient force to insert the portions 37 through the basket rim in the manner shown in Figs. 14 and 20 of the drawings. It will be seen that the driver 34 is also bifurcated to slide over the plate 32, as shown in Figs. 13 and 14, and in this way the stripping of the fastener from the plate 32, and the driving of the right-angle end portions thereof through the basket rim, are accomplished by the actuation of the bell crank 46, when the slide 29 moves toward the shaft 16, whereas the bending of the straight length of wire upon the plate 32, in the manner shown and described, is accomplished by the former 25 when the latter is actuated by the slide 26 in a direction away from the shaft 16, and it is again stated that it will be understood that these forming and driving instrumentalities are duplicated at opposite sides of the machine.

The wire must feed downwardly very accurately, in front of the bifurcated end of the former 25, and in rear of the curved end edge of the plate 32, in order to be properly formed, and for this purpose a pivoted spring-controlled guide 51 having an oblique guiding surface 52 is pivoted on a stationary support at 53 and provided at its other end with a roller or projection 54. See Figs. 7, 9, and 28. The lower end of the wire, as it is fed downwardly, strikes the inclined surface 52, and in this way the wire is deflected into position against the edge of the plate 55, and then downwardly in a position to be formed upon the plate 32 in the manner shown and described. Of course, before the upper portion of the straight length of wire can be wiped over and laid flatwise upon the top of the plate 32, the operative end of the deflector 51 must be withdrawn from the vertical plane of the wire, and this is done by a cam 56 on the end of the rod 57, which latter is rigid with the slide 29 previously mentioned. This cam 56 engages the roller 54 to move the deflector into the path of the wire, when the rod 57 moves toward the shaft 16, but when the cam 56 moves away from the shaft 16, it releases the roller 54 and permits the squared end portion having the deflecting surface 52 to recede or back out of the opening 58 in the stationary plate 59 forming a part of the casing for the fastener forming elements. This withdrawal of the deflector portion 52 from the vertical plane of the fastener, leaves the way clear for the former 25 to bend the upper end portion of the wire downwardly and flatwise upon the upper surface of the plate 32, while at the same time the lower end portion of this wire is deflected upwardly against the bottom of this plate. Thus the fastener is primarily formed in accurate condition upon the stationary plate 32, then has its end portions bent at right angles by the so-called wiper or forming element 33, in the manner explained, while being held tightly in place by the former 25 on the plate 32. Thereafter, when the former 25 has receded, to its normal position, the stripper 49 and the driver 34 strip the fastener off the plate 32 and insert the right-angle end portions thereof through the basket rim, in the manner shown and described.

The mechanism for clinching the wire ends, to form the flatwise clinched outer ends 60 upon the outer side of the basket rim, comprises the pivoted clincher 61 pivoted on a stationary portion of the machine at 62 and provided with deflecting or clinching grooves 63, as shown in Fig. 23 of the drawings. The endwise adjustable actuating rod 64 is pivoted at 65 upon the end of said clincher 61, and has its other end pivoted at 66 on the reciprocating slide 67, as shown in Figs. 8 and 9 of the drawings. This slide 67 has a roller 68 which engages the cam 69, whereby the latter reciprocates the slide 67, and thereby actuates the clincher 61 in properly timed relation to the other elements of the machine. When the end portions 37 of the fastener are driven through the basket rim, the wire ends encounter the grooves 63, and deflect the wire ends toward the rim of the basket, and the actuation of the clincher 61 then serves to flatten the outer end portions 60 of the fastener tightly against the outer side of the basket rim.

In this way, the staple-shaped or bail-shaped fastener is primarily, before its final formation, formed much like a hair pin, and is disposed in a vertical plane parallel with the axis of the basket. Two of these fasteners are thus formed simultaneously at opposite sides of the basket, these two vertical planes being well inside of the basket rim. Thereafter, as explained, the ends of these hair-pin shaped blanks, so to speak, are bent at right angles, in a vertical transverse plane extending through the basket rim, and the two fasteners at opposite sides of the basket are then shifted bodily and forcibly inserted outwardly through the opposite sides of the basket rim, and the clinching mechanism, also duplicated at opposite sides of the machine, is then effective to clinch both fasteners by bending the end portions thereof flatwise against the outer sides of the basket rim, at diametrically opposite sides of the basket.

Of course, it will be understood that the invention, so far as any novelty in the forming and driving and clinching elements is concerned, is not limited to the use of mechanism of this kind in duplicate to form and drive two fasteners simultaneously, or at the same time. It is obvious, for example, that such forming and driving and clinching elements may be used in a single mechanism, on a machine for inserting one fastener at a time. But efficiency is gained, and production speeded up, of course, by using said elements in duplicate, in a machine for inserting a plurality of fasteners at the same time.

As shown in Fig. 25, these fasteners extend upwardly inside of the hoop 70 of the basket top 71, which latter is of the usual form, or of any suitable or desired character. This illustrates the purpose and function of said fasteners in actual use, said fasteners being bent downwardly outside of the basket cover hoop, thereby to fasten the cover in place. Fasteners of this kind are common and well known, and the machine shown and described, which is illustrative of the invention, is highly effective for the making and insertion of these fasteners in the baskets, preliminary to the fastening of the covers in place.

It will be seen that the irregular curved outer edges of the two plates 32 permit the basket to be readily removed from the machine, without permitting the wire fastening devices to catch on anything. It will also be seen that the single transverse shaft 72 is operated by the chain 15, from the shaft 16, whereby both sets of wire feed rolls 12 and 14 are operated simultaneously, whereby the wire is first fed upwardly and is then brought down and fed downwardly through the forming mechanism at each side of the machine.

As shown in Fig. 7, the machine is formed to receive the basket rim 73 in position to receive the fasteners, being directed into this position by the curved guides 7 previously mentioned. A removable cap plate 74 is secured to the top of the casing 75, which forms the guides for the slides 26 and 29 previously mentioned. These are some of the less important details of the machine, although helpful in insuring the desired results.

A further and special feature of improvement is this: When the baskets are stacked it is desirable that the wire devices which have been attached to the basket rims be of such character that they will not interfere with the stacking of the baskets. They will interfere, very obviously, if they extend vertically from the edge of each basket, for in that case the next basket will rest on the fasteners of the basket below, and the fasteners are liable to be bent out of shape, and the baskets might not be stacked properly. To overcome this difficulty, the pivoted clinchers 61, as shown in Figs. 23 to 26 inclusive, are each provided with a bifurcated portion 76 having prongs 77, which latter are in turn provided with hooks or catch portions 78, and with the beveled guide portions 79, as shown. In clinching the portions 37, the prongs 77 receive the wire fastener between them, as shown in Fig. 25, and when the clinchers recede or move back to normal position, the hooks or catch portions 78 pull the fastener outwardly as shown in Fig. 26 of the drawings, this being done at each side of the basket. In this way, each wire fastening device, or cover retaining device, in its final form, extends upwardly and outwardly from the rim of the basket, so that the two fasteners flare apart at their upper ends, in their relation to each other, thus making it easy for the basket above to be forced down between them, in stacking the baskets. In this way, the fasteners or cover retaining devices are not left in vertical position, on the rim of the basket, but are bent outwardly in a manner that prevents interference with the stacking of the baskets.

As a matter of further and special improvement, while it is true that suitable feed devices for feeding the wire can be used for the broader purposes of the invention, it is nevertheless true that a better feeding action is obtained by taking the wire from the reels 10 in a loose or more or less disordered condition, just as the wire comes from the package in which it has been shipped, and then feeding it continuously in an upward direction, by the continuous feed rolls of the feed mechanism 12, and by then converting this continuous feed of the wire into an intermittent feed suitable for the wire forming and driving mechanism, by means of the feed rolls 14 previously described. The devices 13 will straighten the wire and put it in good condition to be received by the mechanism for forming the preliminary or staple shaped wire blanks from which the fasteners or cover retaining devices are made, in the manner previously described. The relative speeds of the mechanism 12 and the feed rolls 14 is suitably adjusted, of course, so that while the mechanism 12 will feed the wire continuously, it is nevertheless true that the intermittent feed of the rolls 14 is of such feed that the wire will not undesirably accumulate between the mechanism 12 and the mechanism 14, but will remain sufficiently slack at these points, and in such condition that the intermittent feed rolls 14 will bear upon a free and slack quantity of wire, in a manner that will insure a free and proper feeding of the wire to the forming and driving mechanism. In other words, the wire is allowed to form in loops between the mechanism 12 and the mechanism 14, in the manner shown more clearly in Fig. 1 of the drawings, and in this way it is possible to avoid the use of a direct intermittent feed from the reels 10, with consequent stumbling or binding of the wire at different places. In other words, the wire comes from the reels 10 continuously in an advantageous manner, and this continuous feed is then converted into an intermittent feed to suit the requirements of the fastener forming and driving mechanism. As previously stated, continuous feed rolls, and intermittent feed rolls, are well known and do not need further description thereof, except to say that the rolls of the mechanism 12 may have continuous peripheries to produce the continuous feed, while the rolls of the mechanism 14 may have mutilated peripheries in a well known manner to produce the intermittent feed.

As a matter of further and special improvement, the stripper 49 at each side of the machine, desirably, has the following specific formation: The shoulder 80 does the stripping, as illustrated more clearly in Fig. 12 of the drawings, while the step portion 81 forms a backing for the end of the staple shaped fastener, preventing endwise displacement of the fastener, while the driver is inserting the end portions 37 through the basket rim. In addition, the stripper is provided with a slot 82, rounded or beveled at each side thereof, as shown, through which slot the wire is fed downwardly for the next fastener, while the stripper 49 is being returned to its normal or inoperative position. In other words, as soon as the fastener is fully inserted, wire for the next fastener must feed downwardly in front of the end of the plate 32, preliminary to the formation of the next fastener, and such downward feeding of the wire is through the slot 82, as stated, during the return of the stripper 49 to normal position.

Also, the driver and stripper 34 is preferably formed with the nurled portions 83 at the end thereof, to firmly grip the angle portions of the fastener, thereby to insure contact of the wire portions 37 with the grooves 43 of the wiper 33 previously described. This insures a straight insertion of the portions 37 through the basket rim.

What I claim as my invention is:

1. In a machine for making and inserting wire devices, the combination of a movable former, a stationary forming plate adapted and disposed in fixed position to co-operate with the movable former to form the wire device, by bending a length of wire into bail-shaped form, driving mechanism operable at right angles to said movable former to strip the bail-shaped wire device from said forming plate, by lateral movement thereof, and to bend the end portions of said wire device at right angles, operative to insert said wire end portions through the work, and clinching mechanism to clinch the wire ends upon the work.

2. A structure as specified in claim 1, said forming plate being mounted in stationary position.

3. A structure as specified in claim 1, said driving mechanism comprising a wiper for bending the wire ends at right angles, operable across the end of said movable former.

4. A structure as specified in claim 1, said driving mechanism comprising a stripper for engaging the head portion of said wire device, and comprising a wiper for bending the wire ends at right angles, and including also a driver for engaging the right-angle corner portions of said wire device to assist in stripping the same from said forming plate, and to drive the right-angle wire portions through the work.

5. A structure as specified in claim 1, said driving mechanism comprising a stripper for engaging the head portion of said wire device, and comprising a wiper for bending the wire ends at right angles, and including also a driver for engaging the right-angle corner portions of said wire device to assist in stripping the same from said forming plate, and to drive the right-angle wire portions through the work, said driver and said wiper being yieldingly connected, and having an automatic latch device whereby the driver and wiper move a distance in unison, until the wiper engages the work, and whereby said driver is then disconnected from said wiper to insert the wire device in the work.

6. A structure as specified in claim 1, said driving mechanism comprising a wiper and a driver having an automatic latch device whereby the driver and the wiper are normally locked together, having a yielding connection to permit relative movement between them, said wiper adapted to bend the wire ends at right angles, and said driver adapted to force the right-angle wire end portions through the work.

7. A structure as specified in claim 1, said driving mechanism comprising a wiper and a driver having an automatic latch device whereby the driver and the wiper are normally locked together, having a yielding connection to permit relative movement between them, said wiper adapted to bend the wire ends at right angles, and said driver adapted to force the right-angle wire end portions through the work, in combination with a bell crank for actuating said driver, and a cam mechanism for actuating said bell crank.

8. A structure as specified in claim 1, comprising a cam-actuated slide for actuating said movable former, and a wire cutter operated by said slide.

9. A structure as specified in claim 1, comprising a cam operated member for operating said clinching mechanism, and associated cam mechanism for operating said movable former and said driving mechanism.

10. A structure as specified in claim 1, comprising wire feeding instrumentalities, including a pivoted guide for directing the wire in front of said movable former, said guide having automatic motion to move into and out of the path of the wire.

11. A structure as specified in claim 1, comprising wire feeding instrumentalities, including a pivoted guide for directing the wire in front of said movable former, said guide having automatic motion to move into and out of the path of the wire, in combination with a cam operated slide for operating said movable former, said slide having means for automatically operating said pivoted guide.

12. A structure as specified in claim 1, said driving mechanism comprising a bifurcated stripper adapted to straddle said forming plate, and comprising a bifurcated driver, also adapted to straddle said forming plate, together with a wiper operating in relatively movable association with said driver to bend the wire ends at right angles preliminary to the insertion thereof in the work by said driver.

13. A structure as specified in claim 1, comprising actuating means for causing the operation of said movable former and said driving mechanism in timed relation, whereby said movable former is withdrawn from operative relation to said forming plate, before the actuation of said driving mechanism.

14. In a machine for making and inserting wire devices, the combination of a movable former, an anvil co-operating with said former to bend a length of wire into bail-shaped form, a wiper having parallel grooves on one side thereof to bend the parallel wire end portions at right angles, and a driver associated with said wiper and operative to move the said right-angle end portions along said grooves, whereby said grooves serve as guides to direct the wire ends through the work.

15. A structure as specified in claim 14, said anvil comprising a flat plate, and said driver being bifurcated to straddle said flat plate while inserting the fastener in the work.

16. A structure as specified in claim 14, said anvil comprising a flat plate, and said driver being bifurcated to straddle said flat plate while inserting the fastener in the work, together with a bifurcated stripper adapted to straddle the other end portion of said plate to strip the head portion of the fastener from the plate.

17. A structure as specified in claim 14, in combination with means for positioning the rim of the basket to receive the wire device from the inside thereof, whereby said device is driven outwardly through the basket rim, and then clinched on the outer side of said rim.

18. A structure as specified in claim 14, in combination with means for positioning the rim of the basket to receive the wire device from the inside thereof, whereby said device is driven outwardly through the basket rim, and then clinched on the outer side of said rim, said basket positioning means, and said wire device forming and driving means, being duplicated at different sides of the machine, whereby two wire devices are simultaneously inserted at different sides of the basket.

19. In a machine for making and inserting wire devices, the combination of forming and driving mechanism, duplicated at opposite sides of the machine, disposed a distance apart to enter the basket at opposite sides of the interior thereof, each mechanism adapted to bend a length of wire into bail-shaped form, then bend the parallel wire ends at right angles, and then insert the right-angle end portions through the opposite sides of the basket rim, and supporting means for positioning the basket to receive the two wire devices simultaneously, said mechanism being operative to form said devices to be bent outward and downward to fasten a basket cover in place.

20. A structure as specified in claim 19, said mechanism being adapted to insert the fasteners through the basket rim from inside the basket, in combination with clinching means for clinching the wire ends on the outer sides of the basket rim.

21. A structure as specified in claim 19, comprising a transverse shaft in rear of said mechanism, with cam means on said shaft for actuating said mechanism simultaneously at opposite sides of the machine.

22. A structure as specified in claim 19, comprising a transverse shaft in rear of said mechanism, with cam means on said shaft for actuating said mechanism simultaneously at opposite sides of the machine, together with wire feeding means comprising a transverse shaft disposed over said mechanism, and a sprocket chain from one said shaft to the other, thereby to drive said wire feeding means.

23. A structure as specified in claim 19, comprising a transverse shaft in rear of said mechanism, with cam means on said shaft for actuating said mechanism, clinchers for clinching the ends of said wire devices, and cam means on said shaft for operating said clinchers.

24. A structure as specified in claim 19, comprising wire feeding means including feed rolls for first continuously feeding the wire upwardly, and other rolls for then intermittently feeding the wire downwardly to said forming and driving mechanism at each side of the machine.

25. A structure as specified in claim 19, comprising wire feeding means including feed rolls for first continuously feeding the wire upwardly, and other rolls for then intermittently feeding the wire downwardly to said forming and driving mechanism at each side of the machine, there being a single transverse shaft for continuously operating both sets of feed rolls, and means for driving said shaft.

26. In a machine for forming and inserting wire devices through the rim of a container, the combination of means for inserting the device into the container rim, and means to clinch the wire ends against the rim, said clinching means having means to engage and bend the device outwardly of the top of the container, after the clinching operation, while said clinching means are returning to inoperative or normal position.

27. A structure as specified in claim 26, said clinching means comprising a pivoted clincher, and said engaging means comprising a bifurcated portion of said pivoted clincher, with means on the inner side of said bifurcated portion to engage the side portion of the wire device.

28. In a machine for inserting basket cover fasteners through the basket rim, the combination of means disposed in position to enter the basket for inserting the fasteners through the basket rim, by inserting the end portions thereof outwardly through the rim, and instrumentalities for clinching the outer ends of the wire, and for bending the wire fasteners outwardly of the top of the basket, after the clinching operation whereby to facilitate stacking of the baskets.

29. In a machine for inserting wire devices through the rim of a container, the combination of means for including a plate for forming the wire in bail-shape form, substantially like a long staple, and instrumentalities for bending the wire ends at right angles and stripping the wire off of said plate and inserting the ends thereof through the container rim, said stripping means comprising a reciprocating member having a shoulder for engaging the head of the bail-shaped or staple-shaped wire device, forming a backing to prevent endwise displacement of the wire device, during its insertion through the basket rim, and having a slot therein through which the wire will feed for the next wire device, while said reciprocating member is returning to inoperative or normal position.

30. A structure as specified in claim 29, said reciprocating member being rounded or sloping at the sides of said slot, on its upper side.

31. In a machine for making and inserting wire devices in containers, the combination of mechanism for forming and inserting the wire devices in the work, feed devices for intermittently feeding the wire downward to said mechanism, continuous feed rolls for continuously feeding the wire upward and then downward to said intermittent feed devices, means including a common transverse shaft at the rear of the machine for operating both said mechanism and said rolls, and means for supplying the wire to said continuous feed rolls.

32. A structure as specified in claim 31, in combination with wire straightening means interposed between said continuous feed rolls and said intermittent feed devices, thereby to straighten the wire before it enters said intermittent feed devices.

33. In a machine for making and inserting wire devices in a container by forming a bail-shaped or staple-shaped wire device with its ends bent at right angles and inserted through the container rim, the combination of means for forming the bail-shaped or staple-shaped wire device, in preliminary form, means for bending the ends of the device at right angles, and a driver and stripper having nurled end portions to grip the angle portions of the wire fastener, thereby to prevent slippage of the wire relatively to the driver, during the insertion of the wire ends through the container rim.

34. In a machine for making and inserting wire devices, the combination of a staple former, a forming plate adapted to co-operate with the movable former to form the wire device, by bending a length of wire into bail-shaped form, driving mechanism operable at right angles to said movable former to strip the bail-shaped wire device from said forming plate, by lateral movement thereof, and to bend the end portions of said wire device at right angles, operative to insert said wire end portions through the work, and clinching mechanism to clinch the wire ends upon the work, said driving mechanism comprising a stripper for engaging the head portion of said wire device, and comprising a wiper for bending the wire ends at right angles, and including also a driver for engaging the right-angle corner portions of said wire device to assist in stripping the same from said forming plate, and to drive the right-angle wire portions through the work, said driver and said wiper being yieldingly connected, and having an automatic latch device whereby the driver and wiper move a distance in unison, until the wiper engages the work, and whereby said driver is then disconnected from said wiper to insert the wire device in the work.

35. In a machine for making and inserting wire devices, the combination of a staple former, a forming plate adapted to co-operate with the movable former to form the wire device, by bending a length of wire into bail-shaped form, driving mechanism operable at right angles to said movable former to strip the bail-shaped wire devices from said forming plate, by lateral movement thereof, and to bend the end portions of said wire device at right angles, operative to insert said wire end portions through the work, and clinching mechanism to clinch the wire ends upon the work, said driving mechanism comprising a wiper and a driver having an automatic latch device whereby the driver and the wiper are normally locked together, having a yielding connection to permit relative movement between them, said wiper adapted to bend the wire ends at right angles, and said driver adapted to force the right-angle wire end portions through the work.

36. In a machine for making and inserting wire devices, the combination of a staple former, a forming plate adapted to co-operate with the movable former to form the wire device, by bending a length of wire into bail-shaped form, driving mechanism operable at right angles to said movable former to strip the bail-shaped wire device from said forming plate, by lateral movement thereof, and to bend the end portions of said wire device at right angles, operative to insert said wire end portions through the work, and clinching mechanism to clinch the wire ends upon the work, said driving mechanism comprising a wiper and a driver having an automatic latch device whereby the driver and the wiper are normally locked together, having a yielding connection to permit relative movement between them, said wiper adapted to bend the wire ends at right angles, and said driver adapted to force the right-angle wire end portions through the work, in combination with a bell crank for actuating said driver, and a cam mechanism for actuating said bell crank.

37. In a machine for making and inserting wire devices, the combination of a staple former, a forming plate adapted to co-operate with the movable former to form the wire device, by bending a length of wire into bail-shaped form, driving mechanism operable at right angles to said movable former to strip the bail-shaped wire device from said forming plate, by lateral movement thereof, and to bend the end portions of said wire device at right angles, operative to insert said wire end portions through the work, and clinching mechanism to clinch the wire ends upon the work, comprising wire feeding instrumentalities, including a pivoted guide for directing the wire in front of said movable former, said guide having automatic motion to move into and out of the path of the wire.

38. In a machine for making and inserting wire devices, the combination of a staple former, a forming plate adapted to co-operate with the movable former to form the wire device, by bending a length of wire into bail-shaped form, driving mechanism operable at right angles to said movable former to strip the bail-shaped wire device from said forming plate, by lateral movement thereof, and to bend the end portions of said wire device at right angles, operative to insert said wire end portions through the work, and clinching mechanism to clinch the wire ends upon the work, comprising wire feeding instrumentalities, including a pivoted guide for directing the wire in front of said movable former, said guide having automatic motion to move into and out of the path of the wire, in combination with a cam-operated slide for operating said movable former, said slide having means for automatically operating said pivoted guide.

39. In a machine for making and inserting wire devices, the combination of a staple former, a forming plate adapted to co-operate with the movable former to form the wire device, by bending a length of wire into bail-shaped form, driving mechanism operable at right angles to said movable former to strip the bail-shaped wire device from said forming plate, by lateral movement thereof, and to bend the end portions of said wire device at right angles, operative to insert said wire end portions through the work, and clinching mechanism to clinch the wire ends upon the work, said driving mechanism comprising a bifurcated stripper adapted to straddle said forming plate, and comprising a bifurcated driver, also adapted to straddle said forming plate, together with a wiper operating in relatively movable association with said driver to bend the wire ends at right angles preliminary to the insertion thereof in the work by said driver.

40. In a machine for making and inserting wire devices, the combination of a staple former, a forming plate adapted to co-operate with the movable former to form the wire device, by bending a length of wire into bail-shaped form, driving mechanism operable at right angles to said movable former to strip the bail-shaped wire device from said forming plate, by lateral movement thereof, and to bend the end portions of said wire device at right angles, operative to insert said wire end portions through the work, and clinching mechanism to clinch the wire ends upon the work, comprising actuating means for causing the operation of said movable former and said driving mechanism in timed relation, whereby said movable former is withdrawn from operative relation to said forming plate, before the actuation of said driving mechanism.

41. In a machine for making and inserting wire devices, the combination of a movable former, an anvil disposed in fixed position and co-operating with said former to bend a length of wire into bail-shaped form, a wiper having parallel grooves on one side thereof to bend the parallel wire end portions at right angles, and a driver associated with said wiper and operative to move the said right-angle end portions along said grooves, whereby said grooves serve as guides to direct the wire ends through the work.

42. In a machine for making U-shaped or bail-shaped wire devices, the combination of a fixed stationary member, an endwise movable former for bending the wire upon said member, whereby said member is temporarily between the legs of each said U-shaped or bail-shaped devices, and means for stripping the wire device sidewise from said member, whereby said stationary member is in effect withdrawn from between said legs.

Specification signed this fourth day of November 1931.

WALTER F. NEWHOUSE.